US012673813B2

(12) United States Patent
Job et al.

(10) Patent No.: US 12,673,813 B2
(45) Date of Patent: Jul. 7, 2026

(54) WASHING AGENT PRESENTATION FORM

(71) Applicant: HENKEL AG & CO. KGAA, Düsseldorf (DE)

(72) Inventors: Mareile Job, Leverkusen (DE); Matthias Sunder, Düsseldorf (DE); Marouane Jaafour, Willich (DE); Arno Düffels, Düsseldorf (DE); Steffen Ristau, Düsseldorf (DE)

(73) Assignee: Henkel AG & Co. KGaA, Düsseldorf (DE)

(*) Notice: Subject to any disclaimer, the term of this patent is extended or adjusted under 35 U.S.C. 154(b) by 235 days.

(21) Appl. No.: 18/280,237

(22) PCT Filed: Jan. 12, 2022

(86) PCT No.: PCT/EP2022/050513
§ 371 (c)(1),
(2) Date: Sep. 3, 2023

(87) PCT Pub. No.: WO2022/184331
PCT Pub. Date: Sep. 9, 2022

(65) Prior Publication Data

US 2024/0067442 A1 Feb. 29, 2024

(30) Foreign Application Priority Data

Mar. 3, 2021 (EP) .................................... 21160374

(51) Int. Cl.
*B65D 85/00* (2006.01)
*C11D 17/00* (2006.01)
*C11D 17/04* (2006.01)

(52) U.S. Cl.
CPC .......... *B65D 85/54* (2013.01); *C11D 17/0039* (2013.01); *C11D 17/04* (2013.01)

(58) Field of Classification Search
CPC . B65D 81/24; B65D 5/02; B65D 5/66; B65D 75/002; B65D 77/02; B65D 85/54; B65D 85/62; C11D 17/0039
USPC ............ 206/499, 449, 524.1, 246, 271, 256; 229/120.02
See application file for complete search history.

(56) References Cited

U.S. PATENT DOCUMENTS 4,944,394 A * 7/1990 Campbell .......... B65D 85/1072 206/256
6,604,530 B1 * 8/2003 Rogari .................. A24F 19/145 220/523
8,763,800 B2 * 7/2014 Agirbas ........... B65D 85/10564 206/256

(Continued)

FOREIGN PATENT DOCUMENTS

DE 10018003 A1 10/2001
GB 957821 A 5/1964

(Continued)

*Primary Examiner* — Rafael A Ortiz
(74) *Attorney, Agent, or Firm* — Blank Rome LLP

(57) ABSTRACT

A washing agent presentation form includes a cardboard outer packaging having a bottom surface, a top surface, and side walls located between the bottom surface and the top surface, and cuboidal washing agent shaped bodies. The outer packaging has a fill level of from 85 vol. % to 99 vol. % and at least one of the side walls of the outer packaging has a cavity with a volume that is at least 10 vol. % of the volume of the side wall.

15 Claims, 3 Drawing Sheets

(56) References Cited

U.S. PATENT DOCUMENTS

| | | | | |
|---|---|---|---|---|
| 2004/0004016 | A1* | 1/2004 | Rawat | B65D 5/5028 206/499 |
| 2005/0241980 | A1 | 11/2005 | Schmitt et al. | |
| 2018/0207895 | A1* | 7/2018 | Lau | B31B 50/62 |

FOREIGN PATENT DOCUMENTS

| | | | | |
|---|---|---|---|---|
| WO | WO-0230786 | A1 * | 4/2002 | B65D 5/4237 |
| WO | WO-2004046297 | A1 * | 6/2004 | C11D 17/0078 |
| WO | 2004058580 | A1 | 7/2004 | |

* cited by examiner

WASHING AGENT PRESENTATION FORM

CROSS-REFERENCE TO RELATED APPLICATIONS

This application is a National Stage of International Patent Application No. PCT/EP2022/050513, filed Jan. 12, 2022, which claims foreign priority to European Patent Application No. 21160374.1, filed Mar. 3, 2021, the disclosures of which are hereby incorporated by reference herein in their entireties.

FIELD OF THE INVENTION

The present invention relates to a washing agent presentation form, comprising an outer packaging and washing agent shaped bodies which are in a sorted arrangement in the outer packaging. In particular, the invention relates to washing agent presentation forms which have sorted washing agent shaped bodies and outer packagings with high degrees of filling.

BACKGROUND

Continuously changing requirements are placed on the forms of manufacture and supply of washing and cleaning agents. The main focus has, for quite some time, been on the convenient dosing of washing agents and cleaning agents by the consumer and the simplification of the work steps necessary for carrying out a washing or cleaning method. A technical solution is provided by pre-portioned washing or cleaning agent metering units, for example water-soluble containers having one or more receiving chambers for powdered or liquid washing or cleaning agents. A further technical solution is provided by washing agent tablets which can have a single-phase or multi-phase design.

Both the water-soluble containers and the washing agent tablets are generally hygroscopic, due to the active substances included therein. In order to prevent water absorption, the pre-portioned washing or cleaning agent metering units are individually packaged by means of water-impermeable packaging means, for example flow packs based on water-insoluble polymer films. Alternatively, a plurality of washing or cleaning agent metering units can be packaged in a container which in turn has a water vapor barrier and in this way reduces the admission of water to the metering units.

Regardless of whether the packaging means used to reduce the admission of water enclose individual washing or cleaning agent metering units or a plurality of washing or cleaning agent metering units, the use thereof is undesirable for ecological reasons. An aim of the development of novel washing agent presentation forms is therefore to provide packaging solutions and manufacturing forms which, on the basis of recycled or recyclable or biodegradable materials, as far as possible achieve the technical advantages of biologically non-recycled or non-recyclable or non-biodegradable materials. The optimization and continued development of already existing, sustainable technical solutions offers a starting point for this development.

A technical problem which has attracted particular attention with respect to washing or cleaning agent metering units, in particular to washing or cleaning agent tablets, is that of ensuring the transport and storage stability of these metering units. The concept of transportation and storage stability includes not only ensuring the physical stability of the washing or cleaning agent metering units, for example against breakage, but also ensuring the chemical stability of the washing or cleaning agent metering units, for example against premature abreaction and disintegration of the 3D shape caused by abreaction. A conventional approach for ensuring the transport and storage stability of washing or cleaning agent tablets consists in packaging these tablets by means of individual flow pack packaging having three-sided weld seams and the fin seams characteristic of these flow packs. These flow packs are generally produced from non-biodegradable, water-insoluble polymer films and, in addition to the washing or cleaning agent metering unit, also enclose a considerable air volume. In the case of mechanical stress, this air volume and the above-mentioned fin seams ensure the physical integrity of the metering units due to their damping effect. In addition, the water-insoluble polymer films prevent unwanted admission of water from the ambient air, and thus also chemically stabilize the washing or cleaning agent metering units.

SUMMARY OF THE INVENTION

Against the background of the prior art described above, the object of the application was to provide washing agent portion units which can be produced by means of simplified methods, have a high transport and storage stability, and can be prepared in a simple manner using the smallest amounts of packaging means. Finally, the washing agent portion units should have a high product performance and be easy and safe to handle for the consumer.

DETAILED DESCRIPTION

Figure 1:
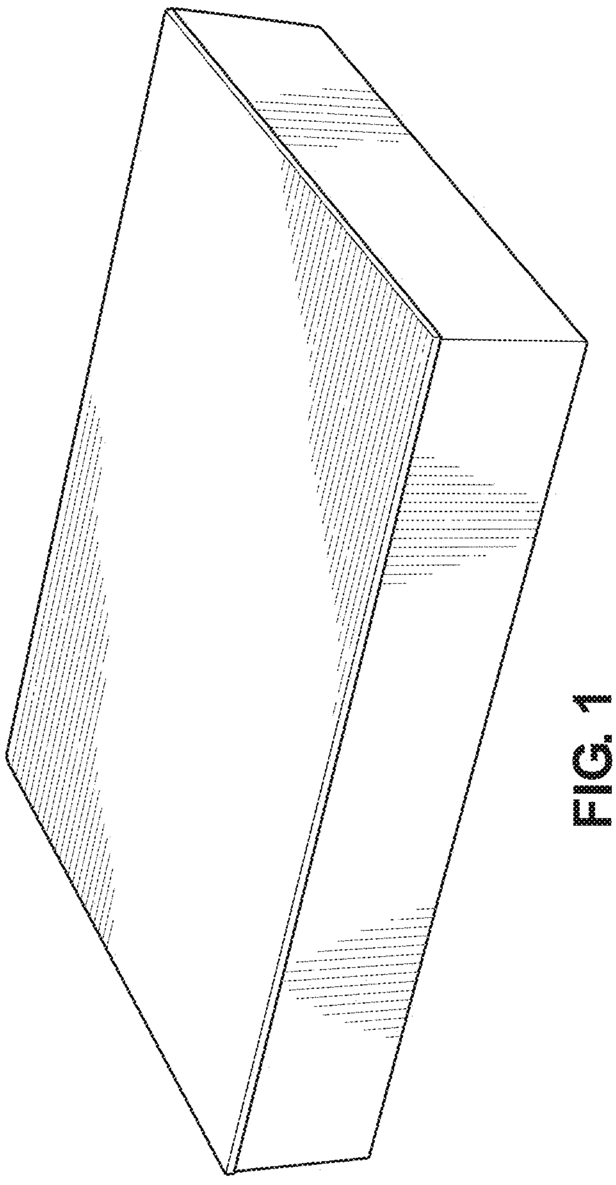
FIG. 1 illustrates an example of a closed outer packaging.
Figure 2:
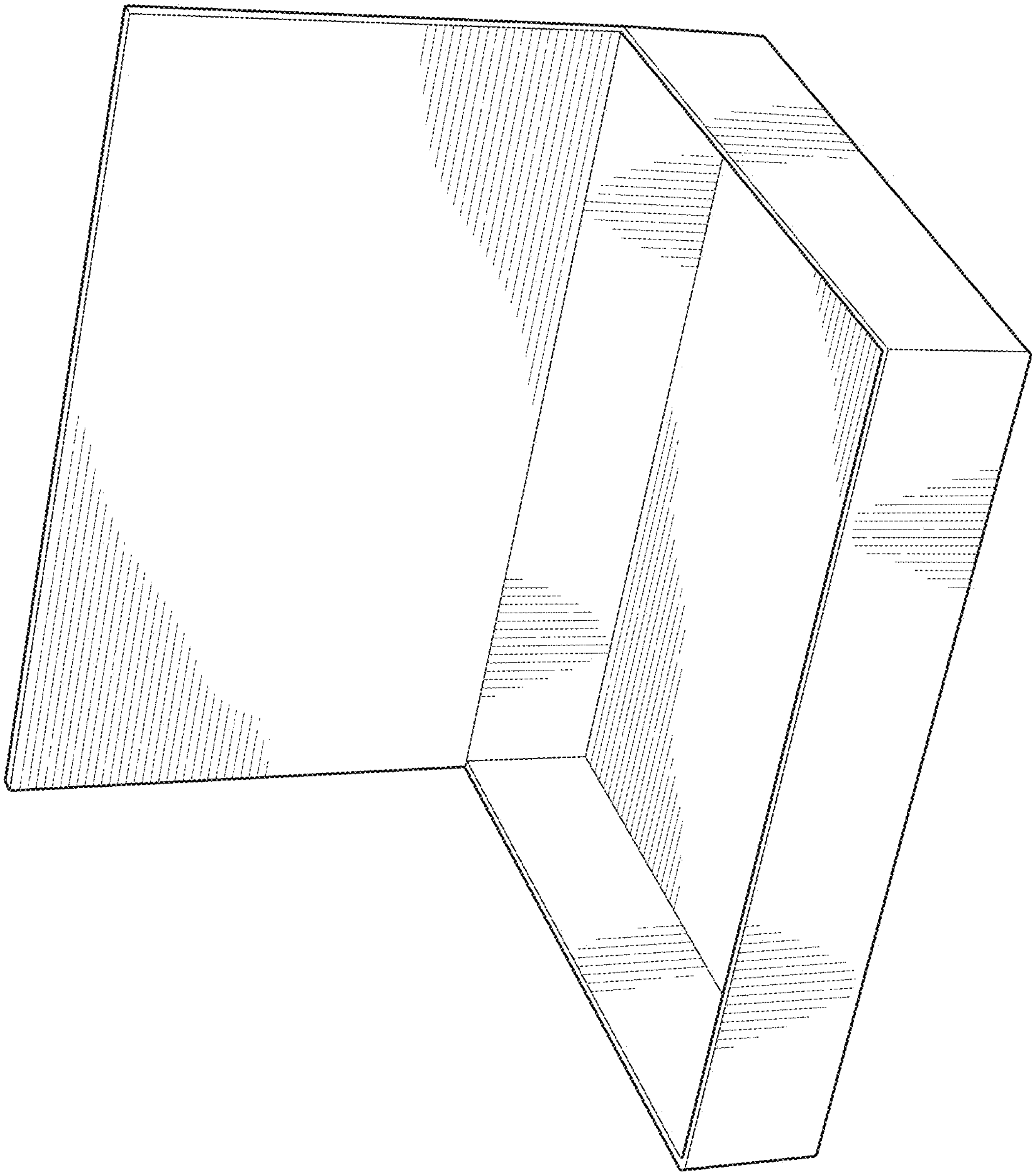
FIG. 2 illustrates an example of an open outer packaging.
Figure 3:
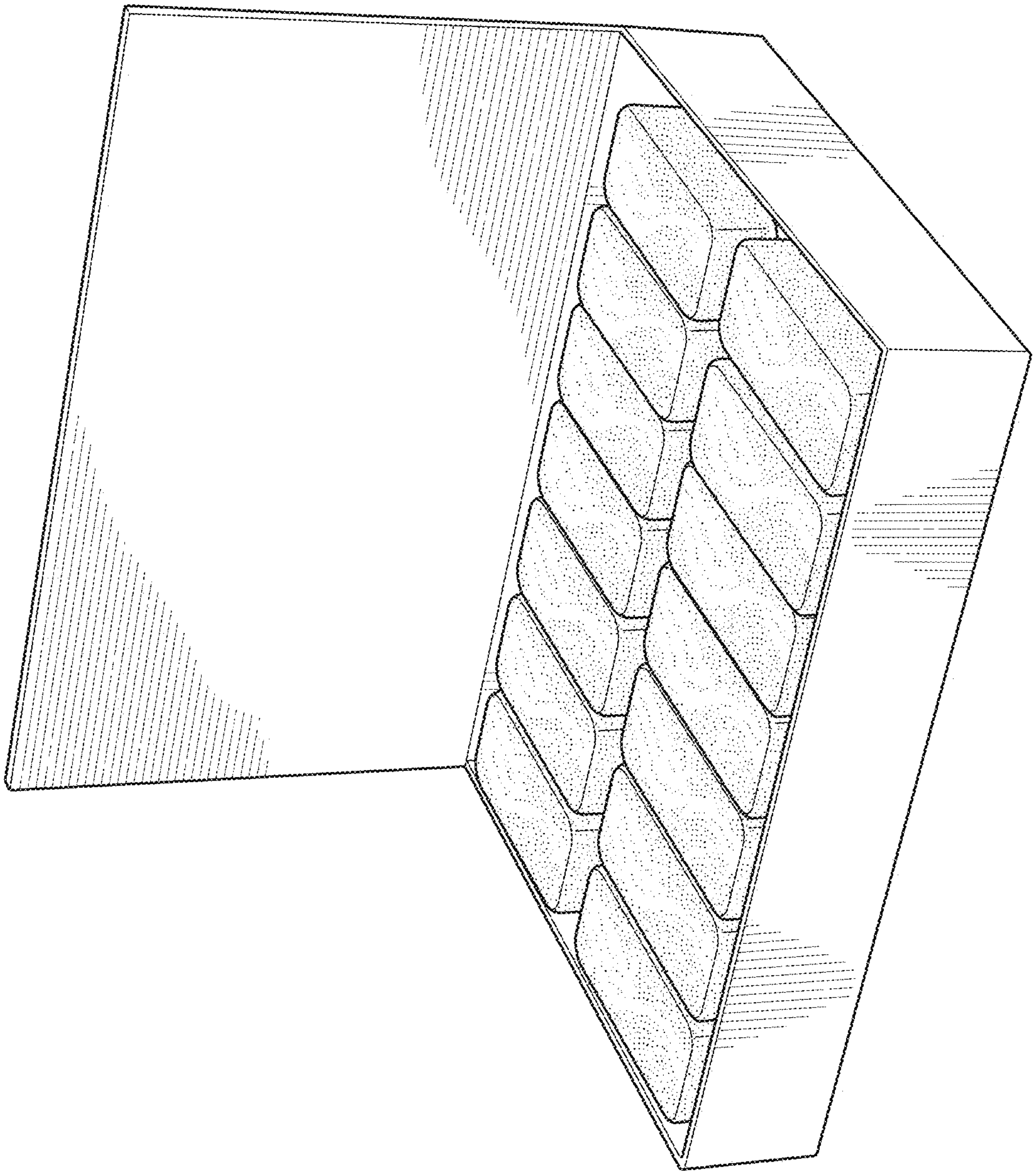
FIG. 3 illustrates an example of an open outer packaging including a plurality of cuboid detergent shaped bodies.

A washing agent presentation form is suitable for achieving these objects and comprises:

a) an outer packaging made of cardboard and having a bottom surface, a top surface and side walls located between the bottom surface and the top surface, b) cuboidal washing agent shaped bodies, wherein i) the outer packaging has a fill level of 85 vol. % to 99 vol. %, and ii) at least one of the side walls of the outer packaging has a cavity or a plurality of cavities, the volume(s) of which is/are at least 10 vol. % of the volume of the side wall.

Surprisingly, it has been found that, in outer packagings having a high degree of filling, the cavities in the side walls of the outer packaging that characterize the subject matter of the claim bring about an improvement in the storage and transport stability of the washing agent shaped bodies.

The outer packaging is preferably designed as a single-piece folding box. Preferred outer packagings have a flat bottom surface, the largest diagonal of which is greater than the height of the outer packaging. This design of the outer packaging increases its stability and enables simple opening and removal. It is particularly preferred if the outer packaging has a flat bottom surface, the largest diagonal of which is more than twice, preferably more than four times, the height of the outer packaging.

To achieve the high fill level, it has proven advantageous for the outer packaging to have an angular bottom surface, preferably a quadrilateral bottom surface, very particularly preferably a rectangular bottom surface. For the same reason and for improving the stackability of the outer packagings, it is preferred that the outer packaging has a top surface that is plane-parallel to the bottom surface. Outer packagings in cuboid form are particularly preferred.

For increasing storage stability, in particular the chemical stabilization of the washing agent shaped bodies, it has proven advantageous for the outer packaging to be reclosable. Suitable closure elements are, for example, adhesive, latching, snapping or plug-in elements, wherein adhesive and plug-in elements are particularly preferred. Exemplary closure elements are plug-in closures or removable adhesive closures.

For reasons of sustainability, recycled and/or recyclable materials are preferred for the production of the outer packaging. The packaging materials are preferably based on renewable raw materials. The use of packaging materials based on pulp and waste paper is particularly preferred.

In a first preferred embodiment, the outer packaging is made of cardboard. In addition to its availability and recyclability, the advantages of cardboard lie in the great variability of available types and grammages. Preferred cardboards have a grammage of 150 to 400 $g/m^2$.

In a particularly preferred embodiment, the corrugated cardboard, which has proven to be technically superior to cardboard in some respects, is used for manufacturing the outer packaging. Corrugated cardboard is characterized by a high strength with low net weight and is a suitable means for storage and transportation even in large containers.

A further significant technical advantage of the corrugated cardboard, in connection with the present invention, is its hollow volume. The design of the side walls of the outer packaging with inclusion of cavities has proven to be surprisingly advantageous for the physical stability of the washing agent shaped bodies. Preferably, at least one of the side walls has a hollow volume which is at least 10 vol. % of the volume of the side wall. Further improved stabilization of the washing agent shaped bodies can be achieved if at least two of the side walls have hollow volumes which are at least 10 vol. % of the volume of the relevant side wall, with it being particularly advantageous if two opposing side walls of the outer packaging have hollow volumes which are at least 10 vol. % of the volume of the relevant side wall. Very particular preference is given to washing agent presentation forms in which all the side walls of the outer packaging have hollow volumes which are at least 10 vol. % of the volume of the relevant side wall.

In addition to physical stability, the chemical stability of the washing agent shaped bodies is surprisingly also promoted by the integration of hollow volumes into the side walls of the outer packaging. A conceivable explanation is that water ingress from the outside into the interior of the outer packaging is made more difficult by the hollow volume interrupting the material of the side walls, and/or the hollow volume in the side walls cushions against moisture ingress.

For the aforementioned reasons, particularly preferred outer packagings have one or more side walls in which the hollow volume is at least 20 vol. %, and preferably at least 40 vol. %, of the volume of the relevant side wall.

The hollow volume in the side walls of the outer packaging can be realized, for example, by using corrugated cardboard. A preferred alternative or supplement to the corrugated cardboard is offered by crimping boxes or hollow edge boxes which are suitable, due to their construction, for realizing hollow volumes in the range of 10 vol. % and higher.

In a preferred embodiment, the outer packaging is designed as a single-piece folding box and has a bottom surface and four side surfaces hinged to the bottom surface, and a top surface and at least three side surfaces hinged to the top surface. The single-piece design of the outer packaging increases its stability and simplifies its production.

As already stated, preferred outer packagings are resealable. A particularly preferred embodiment is folding boxes with folding lids, wherein, in the closed state, parts of the lid preferably overlap with other parts of the box at least partially. By way of example are washing agent presentation forms in which the outer packaging is present in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging such that the outer sides of the side surfaces hinged to the top surface are in contact with the inner sides of the side surfaces hinged to the bottom surface of the outer packaging. In this embodiment, the lid closure is preferably reinforced by friction of the overlapping box parts. This type of lid closure, in which the side surfaces hinged to the top surfaces are guided into the interior of the box, can, in the case of high degrees of filling, and in particular in the case of the outer packaging being filled with washing agent shaped bodies which increase their volume during the course of storage, lead to problems during lid closure, since the side surfaces hinged to the top surface can only be inserted into the interior of the box with difficulty.

Against this background, it may be appropriate to provide alternative washing agent presentation forms in which the outer packaging is in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging such that at least one inner side of a side surface hinged to the top surface is in contact with at least one outer side of the side surfaces hinged to the bottom surface of the outer packaging.

For the reasons mentioned above, washing agent presentation forms are also preferred in which the outer packaging is in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging such that all inner sides of the side surfaces hinged to the top surface are in contact with the outer sides of the side surfaces hinged to the bottom surface of the outer packaging.

In a further alternative embodiment, the outer packaging is in the form of a single-piece folding box with a bottom surface and four side surfaces hinged to the bottom surface, a top surface and four side surfaces hinged to the top surface, an intermediate surface which connects a side surface of the bottom surface to a side surface of the top surface, wherein, in the closed state, the side surfaces of the outer packaging hinged to the top surface overlap with the side surfaces hinged to the bottom surface of the outer packaging such that three of the inner sides of the side surfaces hinged to the top surface are in contact with the outer sides of the side surfaces hinged to the bottom surface of the outer packaging, and the intermediate surface is located between the outer side of the side surface connected to it and hinged to the bottom surface and the inner side of the side surface connected to it and hinged to the top surface. This embodiment enables easier opening of the outer packaging. At the same time, in the closed state, the outer packaging forms a triply-overlapping side surface in the region of the intermediate surface, which side surface is formed from a side surface hinged to the bottom surface, the intermediate surface, and the side surface hinged to the top surface. This reinforced side wall stabilizes the outer packaging during storage and transportation.

Due to the cavity of the side walls that is characteristic of the subject matter of the invention, the previously described outer packagings having overlapping side walls can be repeatedly opened and closed without the friction occurring between the overlapping side walls being significantly reduced. A possible explanation for this may be compressibility of the side walls caused by the cavities.

A feature of preferred outer packaging is the Cobb value of the cardboard used for its production in the range below 25 g/m$^2$, and preferably below 20 g/m$^2$. The Cobb value is a quantity which describes the resistance of paper and cardboard to the absorption of moisture into the material. A high Cobb value means that water penetrates more easily. A low Cobb value means that water penetrates the material only with difficulty. The Cobb value is determined in accordance with DIN EN ISO 535 under 20 g/m$^2$ at 20° C. and standard pressure. Particularly preferred washing agent presentation forms are characterized in that the cardboard used to produce the folding box has a Cobb value below 25 g/m$^2$, preferably below 20 g/m$^2$.

Corresponding Cobb values can be realized in different ways. In an alternative embodiment, the outer packaging comprises, for example, a water-insoluble cover film, preferably a polyethylene cover film. Water-insoluble cover films are generally suitable for preventing or at least reducing the admission of water or water vapor through the outer packaging into the interior of the outer packaging.

To avoid superfluous packaging components, water-insoluble cover films are preferably applied only on the outer or inner side of the outer packaging. For effective limitation of the admission of moisture, full coverage is preferred.

The advantages of full coverage of the outer side of the outer packaging consist, in addition to improved printability of the outer packaging surface, in preventing the admission of water into the cellulose-based packaging material, thus avoiding, for example, the formation of superficial water spots or swelling of the outer packaging.

The full coverage of the inner side of the outer packaging has surprisingly proven advantageous for the adhesion of unpackaged washing agent shaped bodies, in particular unpackaged washing agent tablets. In the case of a combination of an unpackaged tablet and inner-side coverage of the cardboard forming the outer packaging with a water-insoluble cover film, the adhesion of shaped bodies to the surface of the cardboard increases, as a result of which, in particular during transport, the slipping and associated mechanical impacts and damage to the shaped bodies, in particular the tablets in the outer packaging, are reduced.

Despite the technical advantages listed above, it may be preferred, for reasons of sustainable production and packaging of the washing agent shaped bodies, if the outer packaging does not comprise any water-insoluble cover film.

Biodegradable hydrophobic coatings or impregnations have proven to be alternatives to water-insoluble cover films. Particularly preferred is the use of biodegradable hydrophobic coatings or impregnations which comprise a substance from the group of vegetable oils, plant or animal waxes, lignin and lignin derivatives, celluloses and cellulose derivatives, polylactic acid and polylactic acid derivatives.

An essential feature of the washing agent presentation form according to the invention is its high fill level of 85 to 99 vol. % of the outer packaging. This high degree of filling not only reduces the amount of packaging material that can be used for each washing agent shaped body, but surprisingly also increases the physical stability of the washing agent shaped bodies, not only with regard to fracturing of the shaped body but also with respect to abrasion of the shaped body. The fill level of preferred outer packagings is 88 vol. % and 99 vol. %, preferably 92 vol. % and 99 vol. %. The term “fill level” refers to the proportion of the internal volume of the outer packaging that is taken up by the washing agent shaped bodies in the outer packaging.

The washing agent shaped bodies are an essential component of the washing agent presentation form according to the invention. A “shaped body” is a single body that stabilizes itself in the shape imparted to it. This dimensionally stable body is formed from a molding compound (e.g. a composition) in such a way that this molding compound is deliberately brought into a predetermined shape, for example by pouring a liquid composition into a casting mold and then curing the liquid composition, or by compacting a particulate preliminary mixture, for example in the context of a tableting process.

Not only presentation forms for textile washing but also presentation forms for cleaning hard surfaces such as ceramics, glass, metal or tiles are referred to as washing agent shaped bodies. Particularly preferred are washing agent shaped bodies, in particular washing agent shaped bodies for textile washing, since they are usually characterized by a comparatively low hardness of the shaped bodies due to the need for rapid disintegration in the washing liquor. The washing agent shaped bodies preferably have a weight of 14 g to 42 g, more preferably of 20 g to 38 g, in particular of 24 g to 34 g.

Due to their manufacturability and their properties relating to removal from the outer packaging, washing agent shaped bodies which have a flat lower face, the largest diagonal of which is more than twice, preferably more than four times the height of the washing agent shaped bodies, are preferred.

It is particularly preferred if the washing agent shaped bodies are present as tablets or comprise tablets.

The cuboidal washing agent shaped bodies comprise a lower face, an upper face and a lateral face connecting the lower face and the upper face. It has also proven advantageous for the stability of the shaped bodies if the edges delimiting the lower face and the upper face are chamfered. To increase the stability of the shaped bodies, it may also be appropriate to round off the edges of the lateral faces connecting the lower faces and the upper faces.

The density of preferred washing agent shaped bodies is 1.1 g/cm$^3$ to 1.5 g/cm$^3$, preferably 1.15 g/cm$^3$ to 1.3 g/cm$^3$. As a consequence of the high density of the shaped bodies and the high fill level, the washing agent presentation forms according to the invention have comparatively high densities, for example, densities in the range of 0.9 g/cm$^3$ to 1.4 g/cm$^3$, preferably in the range of 1.05 g/cm$^3$ to 1.3 g/cm$^3$.

Preferred washing agent shaped bodies have a rough upper face or a rough lower face, the average roughness of which is from 25 μm to 1,000 μm, preferably from 50 μm to 800 μm. Roughness describes the deviation of a real surface from an ideally smooth surface and is determined, for example, by means of confocal laser scanning microscopy.

The roughness values preferred according to the invention reduce abrasion of the shaped bodies during production and transportation and at the same time ensure sufficient adhesion of the shaped bodies to the material of the outer packaging and to the other shaped bodies located in the outer packaging, as a result of which they are stabilized within the outer packaging.

To improve their integrity, the washing agent shaped bodies can have a film packaging, wherein it is particularly preferred if each of the detergent shaped bodies has a separate film packaging.

If film packagings are used, film packagings made of a water-soluble film material are preferred. The water-soluble film material may comprise one or more structurally different water-soluble polymer(s). Suitable water-soluble polymer(s) are in particular polymers from the group of (optionally acetalized) polyvinyl alcohols (PVAL) and copolymers thereof.

Water-soluble film materials are preferably based on a polyvinyl alcohol or a polyvinyl alcohol copolymer of which the molecular weight is in the range of from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis of 70 to 100 mol. %, preferably 80 to 90 mol. %, particularly preferably 81 to 89 mol. %, and in particular 82 to 88 mol. %.

Preferred polyvinyl alcohol copolymers include, in addition to vinyl alcohol, an ethylenically unsaturated carboxylic acid, or the salt or ester thereof. In addition to vinyl alcohol, such polyvinyl alcohol copolymers particularly preferably include sulfonic acids, such as 2-acrylamido-2-methyl-1-propane sulfonic acid (AMPS), acrylic acid, methacrylic acid, acrylic acid esters, methacrylic acid esters, or mixtures thereof, among the esters, preference is given to C1-4 alkyl esters or hydroxyalkyl esters. Ethylenically unsaturated dicarboxylic acids, for example itaconic acid, maleic acid, fumaric acid and mixtures thereof, are possible as further monomers.

Due to their availability, easy processability and biodegradability, film packagings that consist of at least 40 wt. %, preferably at least 60 wt. % and in particular at least 80 wt. % of polyvinyl alcohol are preferred.

In order to increase the stability of the shaped bodies and to ensure a sufficient degree of filling in the outer packaging, it is preferred for the film packaging to be shrunk onto the washing agent shaped bodies.

For reasons of the sustainable design of the washing agent presentation form, it may be advisable to dispense with a film packaging for the washing agent shaped bodies.

In fact, the washing agent shaped bodies in the washing agent presentation forms according to the invention have proven to be unexpectedly stable. This also applies in particular to washing agent tablets which tend to exhibit reduced transport and storage stability due to their hygroscopicity, for example due to the integration of tablet disintegrants.

Washing agent shaped bodies which are particularly preferably suitable for packaging in the washing agent presentation forms according to the invention are in particular washing agent shaped bodies which have a water absorption (2 weeks, 35° C., 80% relative humidity) above 20 mg/g, preferably above 30 mg/g.

Also suitable for packaging in the washing agent presentation forms are washing agent shaped bodies which have a volume expansion (2 weeks, 35° C., 80% relative humidity) above 5 vol. %, preferably above 7 vol. % and in particular from 8 vol. % to 18 vol. %. This type of increase in volume can be observed, for example, in washing agent shaped bodies which contain a disintegration aid, in particular a polymeric disintegration aid, for example a disintegration aid based on polyvinylpyrrolidone or cellulose.

In order to reduce the proportion of packaging per washing agent shaped body, it is preferred if the washing agent presentation form comprises at least ten, preferably at least twenty, particularly preferably at least thirty, washing agent shaped bodies which are in a sorted arrangement in the outer packaging.

In the case of integration of a larger number of washing agent shaped bodies into the washing agent presentation form, the stability of the shaped bodies can be further improved by a targeted arrangement of the shaped bodies. Washing agent presentation forms which comprise at least ten, preferably at least twenty, particularly preferably at least thirty, washing agent shaped bodies which are in a sorted arrangement in the outer packaging such that each of the washing agent shaped bodies is in direct contact with at least three other washing agent shaped bodies have proven to be advantageous.

In summary, the following subjects, inter alia, are provided by this application:

1. A washing agent presentation form, comprising
   a) an outer packaging made of cardboard and having a bottom surface, a top surface and side walls located between the bottom surface and the top surface,
   b) cuboidal washing agent shaped bodies, wherein
      i) the outer packaging has a fill level of 85 vol. % to 99 vol. %, and
      ii) at least one of the side walls of the outer packaging has a cavity or a plurality of cavities, the volume(s) of which is/are at least 10 vol. % of the volume of the side wall.
2. The washing agent presentation form according to point 1, wherein the outer packaging has a flat bottom surface, the largest diagonal of which is greater than the height of the outer packaging.
3. The washing agent presentation form according to one of the preceding points, wherein the outer packaging has a flat bottom surface, the largest diagonal of which is more than twice, preferably more than four times, the height of the outer packaging.
4. The washing agent presentation form according to one of the preceding points, wherein the outer packaging has an angular bottom surface, preferably a quadrilateral bottom surface, very particularly preferably a rectangular bottom surface.
5. The washing agent presentation form according to one of the preceding points, wherein the outer packaging has a top surface plane-parallel to the bottom surface.
6. The washing agent presentation form according to one of the preceding points, wherein the outer packaging has a cuboidal shape.
7. The washing agent presentation form according to one of the preceding points, wherein the outer packaging is reclosable.

8. The washing agent presentation form according to one of the preceding points, wherein the washing agent shaped bodies have a weight of 14 g to 42 g, preferably of 20 g to 38 g, in particular of 24 g to 34 g.
9. The washing agent presentation form according to one of the preceding points, wherein the washing agent shaped bodies are present as tablets.
10. The washing agent presentation form according to one of the preceding points, wherein the washing agent shaped bodies have a flat lower face, the largest diagonal of which is more than twice, preferably more than four times, the height of the washing agent shaped bodies.
11. The washing agent presentation form according to one of the preceding points, comprising cuboidal washing agent shaped bodies having a lower face, an upper face and lateral surfaces connecting the lower face and the upper face, wherein the edges delimiting the lower face and the upper face are chamfered.
12. The washing agent presentation form according to one of the preceding points, comprising cuboidal washing agent shaped bodies having a lower face, an upper face and lateral surfaces connecting the lower face and the upper face, wherein the edges of the lateral surfaces connecting the lower face and the upper face are rounded.
13. The washing agent presentation form according to one of the preceding points, wherein the washing agent presentation form comprises at least ten, preferably at least twenty, particularly preferably at least thirty, washing agent shaped bodies which are in a sorted arrangement in the outer packaging.
14. The washing agent presentation form according to one of the preceding points, wherein the washing agent presentation form comprises at least ten, preferably at least twenty, particularly preferably at least thirty, washing agent shaped bodies, which are in a sorted arrangement in the outer packaging such that each of the washing agent shaped bodies is in direct contact with at least three other shaped bodies.
15. The washing agent presentation form according to one of the preceding points, wherein the washing agent shaped bodies have a density of 1.1 g/cm$^3$ to 1.5 g/cm$^3$, preferably of 1.15 g/cm$^3$ to 1.3 g/cm$^3$.
16. The washing agent presentation form according to one of the preceding points, wherein the washing agent shaped bodies have a rough upper face or a rough lower face, the average roughness of which is from 25 μm to 1,000 μm, preferably from 50 μm to 800 μm.
17. The washing agent presentation form according to one of the preceding points, wherein the outer packaging has a fill level of 88 vol. % to 99 vol. %, preferably of 92 vol. % to 99 vol. %.
18. The washing agent presentation form according to one of the preceding points, wherein the outer packaging is made of cardboard.
19. The washing agent presentation form according to one of the preceding points, wherein the outer packaging is made of corrugated cardboard.
20. The washing agent presentation form according to one of the preceding points, wherein the outer packaging is designed as a crimping box.
21. The washing agent presentation form according to one of the preceding points, wherein the outer packaging is designed as a hollow edge box.
22. The washing agent presentation form according to one of the preceding points, wherein at least two of the side walls of the outer packaging have a cavity or a plurality of cavities, the volume(s) of which is/are at least 10 vol. % of the volume of the relevant side wall.
23. The washing agent presentation form according to one of the preceding points, wherein at least two opposing side walls of the outer packaging have a cavity or a plurality of cavities, the volume(s) of which is/are at least 10 vol. % of the volume of the relevant side wall.
24. The washing agent presentation form according to one of the preceding points, wherein all side walls of the outer packaging have a cavity or a plurality of cavities, the volume(s) of which is/are at least 10 vol. % of the volume of the relevant side wall.
25. The washing agent presentation form according to one of the preceding points, wherein the volume of the cavity/cavities is at least 20 vol. %, preferably at least 40 vol. %, of the volume of the relevant side wall.
26. The washing agent presentation form according to one of the preceding points, wherein the outer packaging is in the form of a single-piece folding box and has a bottom surface and four side surfaces hinged to the bottom surface, and a top surface and at least three side surfaces hinged to the top surface.
27. The washing agent presentation form according to one of the preceding points, wherein the outer packaging is present in the form of a single-piece folding box and has a bottom surface and four side surfaces hinged to the bottom surface, as well as a top surface and at least three side surfaces hinged to the top surface, and, in the closed state, the side surfaces of the outer packaging hinged to the top surface overlap with the side surfaces hinged to the bottom surface of the outer packaging such that the outer sides of the side surfaces hinged to the top surface are in contact with the inner sides of the side surfaces hinged to the bottom surface of the outer packaging.
28. The washing agent presentation form according to one of the preceding points, wherein the outer packaging is in the form of a single-piece folding box and has a bottom surface and four side surfaces hinged to the bottom surface, as well as a top surface and at least three side surfaces hinged to the top surface, and, in the closed state, the side surfaces of the outer packaging hinged to the top surface overlap with the side surfaces hinged to the bottom surface of the outer packaging such that at least one inner side of a side surface hinged to the top surface is in contact with at least one outer side of the side surfaces hinged to the bottom surface of the outer packaging.
29. The washing agent presentation form according to one of the preceding points, wherein the outer packaging is present in the form of a single-piece folding box and has a bottom surface and four side surfaces hinged to the bottom surface and a top surface and at least three side surfaces hinged to the top surface, and, in the closed state, the side surfaces of the outer packaging hinged to the top surface overlap with the side surfaces hinged to the bottom surface of the outer packaging such that all inner sides of the side surfaces hinged to the top surface are in contact with the outer sides of the side surfaces hinged to the bottom surface of the outer packaging.
30. The washing agent presentation form according to one of the preceding points, wherein the outer packaging is in the form of a single-piece folding box having a bottom surface and four side surfaces hinged to the bottom surface, a top surface and four side surfaces hinged to the top surface, an intermediate surface which connects a side surface of the bottom surface to a side surface of the top surface, wherein, in the closed state, the side surfaces of the outer packaging hinged to the top surface overlap with the side surfaces hinged to the bottom surface of the outer packaging such that three of the inner sides of the side surfaces hinged to the top surface are in contact with the outer sides of the side surfaces hinged to the bottom surface of the outer packaging, and the intermediate surface is located between the outer side of the side surface connected to it and hinged to the bottom surface and the inner side of the side surface connected to it and hinged to the top surface.

31. The washing agent presentation form according to one of the preceding points, wherein the cardboard used to produce the folding box has a Cobb value below 25 $g/m^2$, preferably below 20 $g/m^2$.

32. The washing agent presentation form according to one of the preceding points, wherein the outer packaging comprises a water-insoluble cover film, preferably a polyethylene cover film.

33. The washing agent presentation form according to one of the preceding points, wherein the outer packaging comprises a water-insoluble cover film, preferably a polyethylene cover film, which covers the outer packaging on its outer side, preferably over the entire surface.

34. The washing agent presentation form according to one of the preceding points, wherein the outer packaging comprises a water-insoluble cover film, preferably a polyethylene cover film, which covers the outer packaging on its inner side, preferably over the entire surface.

35. The washing agent presentation form according to one of the preceding points, wherein the outer packaging does not comprise any water-insoluble cover film.

36. The washing agent presentation form according to one of the preceding points, wherein the outer packaging has a biodegradable hydrophobic coating or impregnation.

37. The washing agent presentation form according to one of the preceding points, wherein the outer packaging has a biodegradable hydrophobic coating or impregnation which comprises a substance from the group of vegetable oils, plant or animal waxes, lignin and lignin derivatives, celluloses and cellulose derivatives, polylactic acid and polylactic acid derivatives.

38. The washing agent presentation form according to one of the preceding points, wherein the washing agent shaped bodies have a film packaging.

39. The washing agent presentation form according to one of the preceding points, wherein each of the washing agent shaped bodies has a separate film packaging.

40. The washing agent presentation form according to one of the preceding points, wherein the washing agent shaped bodies have a film packaging made of a water-soluble film material.

41. The washing agent presentation form according to one of the preceding points, wherein the washing agent shaped bodies have a film packaging which consists of at least 40 wt. %, preferably at least 60 wt. % and in particular at least 80 wt. %, polyvinyl alcohol.

42. The washing agent presentation form according to one of the preceding points, wherein the washing agent shaped bodies have a film packaging which is shrunk onto the washing agent shaped body.

43. The washing agent presentation form according to one of the preceding points, wherein the washing agent shaped bodies have no film packaging.

44. The washing agent presentation form according to one of the preceding points, wherein the washing agent shaped bodies have a water absorption (2 weeks, 35° C., 80% relative humidity) above 20 mg/g, preferably above 30 mg/g.

45. The washing agent presentation form according to one of the preceding points, wherein the washing agent shaped bodies have a volume expansion (2 weeks, 35° C., 80% relative humidity) above 5 vol. %, preferably above 7 vol. % and in particular from 8 vol. % to 18 vol. %.

46. The washing agent presentation form according to one of the preceding points, wherein the washing agent shaped bodies contain a disintegration aid, in particular a polymeric disintegration aid, for example a disintegration aid based on polyvinylpyrrolidone or cellulose.

The invention claimed is:

1. A washing agent presentation form, comprising:

an outer packaging made of cardboard and having a bottom surface, a top surface, and side walls located between the bottom surface and the top surface; and cuboidal washing agent shaped bodies in a sorted arrangement within the outer packaging, wherein:

the outer packaging has a fill level of 85 vol % to 99 vol %, the cuboidal washing agent shaped bodies have a volume expansion of from 8 vol. % to 18 vol. %, at 2 weeks, 35° C., and 80% relative humidity, and at least one of the side walls of the outer packaging defines at least one cavity having a volume that is at least 10 vol % of the volume of the at least one of the side walls.

2. The washing agent presentation form of claim 1, wherein the fill level of the outer packaging is 88 vol % to 99 vol %.

3. The washing agent presentation form of claim 1, wherein the cardboard is corrugated cardboard, and the at least one cavity is at least one corrugation.

4. The washing agent presentation form of claim 1, wherein each of at least two of the side walls of the outer packaging defines at least one cavity having a volume that is at least 10 vol % of the volume of the respective side wall.

5. The washing agent presentation form of claim 4, wherein each of the side walls of the outer packaging defines at least one cavity having a volume that is at least 10 vol % of the volume of the respective side wall.

6. The washing agent presentation form of claim 1, wherein the volume of the at least one cavity is at least 20 vol % of the volume of the at least one of the side walls.

7. The washing agent presentation form of claim 1, wherein the cuboidal washing agent shaped bodies have a water absorption of over 20 mg/g at 2 weeks, 35° C., and 80% relative humidity.

8. The washing agent presentation form of claim 7, wherein the cuboidal washing agent shaped bodies have a water absorption of over 30 mg/g at 2 weeks, 35° C., and 80% relative humidity.

9. The washing agent presentation form of claim 1, wherein each of the cuboidal washing agent shaped bodies is covered by a film.

10. The washing agent presentation form of claim 9, wherein the film comprises a polyvinyl alcohol or a copolymer of polyvinyl alcohol.

11. The washing agent presentation form of claim 1, wherein the cuboidal washing agent shaped bodies are not covered by a film.

12. The washing agent presentation form of claim 2, wherein the fill level of the outer packaging is 92 vol % to 99 vol %.

13. The washing agent presentation form of claim 6, wherein the volume of the at least one cavity is at least 40 vol % of the volume of the at least one of the side walls.

14. The washing agent presentation form of claim 1, wherein:

each of the cuboidal washing agent shaped bodies has a lower face, an upper face, and a lateral face connecting the lower face and the upper face, a diagonal of the lower face is more than twice a height of the lateral face, and the lower face of each of the cuboidal washing agent shaped bodies rests directly on and plane-parallel to the bottom surface of the outer packaging.

15. The washing agent presentation form of claim 14, wherein the diagonal of the lower face is more than four times the height of the lateral face.

* * * * *